(12) United States Patent
Tingley

(10) Patent No.: US 7,748,425 B2
(45) Date of Patent: Jul. 6, 2010

(54) BACKING FILM WIND-UP IN A FIBER PLACEMENT MACHINE

(75) Inventor: Mark Curtis Tingley, Hutsonville, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 985 days.

(21) Appl. No.: 11/510,012

(22) Filed: Aug. 25, 2006

(65) Prior Publication Data

US 2007/0044900 A1 Mar. 1, 2007

Related U.S. Application Data

(60) Provisional application No. 60/711,225, filed on Aug. 25, 2005.

(51) Int. Cl.
*B65H 81/00* (2006.01)
(52) U.S. Cl. .................. 156/441; 156/425; 156/433; 156/523; 156/574
(58) Field of Classification Search ................ 156/425, 156/433, 441, 523, 574
See application file for complete search history.

(56) References Cited

U.S. PATENT DOCUMENTS

| 4,193,834 | A | * | 3/1980 | Bernardi | 156/521 |
| RE30,369 | E | * | 8/1980 | Wilson | 156/392 |
| 4,419,170 | A | * | 12/1983 | Blad | 156/361 |
| 4,591,402 | A | * | 5/1986 | Evans et al. | 156/350 |
| 4,799,981 | A | * | 1/1989 | Stone et al. | 156/64 |
| 4,867,833 | A | * | 9/1989 | McCoy | 156/361 |
| 5,472,553 | A | * | 12/1995 | Roberts | 156/353 |

* cited by examiner

*Primary Examiner*—Jeff H Aftergut
(74) *Attorney, Agent, or Firm*—Reinhart Boerner Van Deuren P.C.

(57) ABSTRACT

A method and apparatus are provided, for handling the backing film in a fiber placement process, by winding-up the backing film, into a roll, as the backing film is separated from a fiber tow. The backing film is wound-up in such a manner that it can be fed back out to rejoin the tow, should it be necessary to rewind a portion of the tow during the fiber placement process. The backing film may be wound onto a paper or cardboard core for ease of removal and handling.

24 Claims, 3 Drawing Sheets

BACKING FILM WIND-UP IN A FIBER PLACEMENT MACHINE

CROSS-REFERENCE TO RELATED PATENT APPLICATIONS

This patent claims the benefit of U.S. Provisional Patent Application No. 60/711,225, filed Aug. 25, 2005, the disclosure and teaching of which are incorporated herein, by reference, in their entireties.

FIELD OF THE INVENTION

This invention relates to the forming of composite structures with automated fiber placement machines, and storage of backing film from fiber tows in automated fiber placement machines.

BACKGROUND OF THE INVENTION

Automated fiber placement machines are widely used to manufacture parts, components and structures from composite material. The materials used in automated fiber placement are typically composed of longitudinal fibers and resin consolidated into tapes, or thin strips, commonly known as "tows." Individual tapes or tows are manipulated by the fiber placement machine to form a band of material that is deposited onto a tool. Parts are built up layer-by-layer, with tapes or tows of composite material, with the angle at which each layer "ply" is laid onto the tool being precisely determined by the fiber placement machine.

Automated fiber placement enables the construction of complex composite structures having steered or curvilinear fiber paths. This method of producing composite structures is more cost effective than manual methods. It provides an improved structural efficiency due to its ability to orient the fibers along local internal loads paths, which potentially results in lighter structures and lower costs than in structures made by other production methods.

The tows of material used in automated fiber placement are typically wound onto spools. Because the tows include a resin, a backing film, made of paper or another suitable material, is typically applied to the tow as it is wound onto the spool to keep adjacent windings of the tow from sticking to one another.

As the fiber tows are unwound from the spools, during the fiber placement process, the backing paper must be separated from the tow, and be stored, or otherwise disposed of. In prior fiber placement machines, the backing paper has typically been pulled away from the tow utilizing a vacuum system, and is often fed to a chopper or shredding apparatus for storage and removal to a disposal site.

The prior method of removing and disposing of backing paper is undesirable in several respects. Containment of the chopped or shredded backing paper may be difficult, particularly during change out of containers used for storage of the chopped or shredded material. This can lead to the chopped and shredded material escaping from the storage containers, and creating undesirable clutter around the fiber placement machine. Where the backing material is a plastic or other polymer, rather than paper, the individual chopped pieces often have considerable electro-static properties and will stick to surfaces where they alight, making it very difficult to clean up any escaped material.

It is also sometimes necessary, during the fiber placement process, to move the fiber placement head of the fiber placement machine away from the part, and back toward the spools supplying the tows of material, in a manner which necessitates rewinding a substantial length of the tows of material back onto the spools. Where the backing paper has been destroyed, by chopping or shredding, it is no longer available for rewinding onto the spool between layers of the rewound tows, creating the potential for having the rewound tows stick to one another.

It is desirable, therefore, to provide an improved apparatus and method for dealing with the backing paper in an automated fiber placement process in a manner which eliminates one or more of the problems described above.

BRIEF SUMMARY OF THE INVENTION

The invention provides an improved method and/or apparatus for handling the backing film in a fiber placement process, by winding-up the backing film as it is separated from the tow. The backing film is wound-up in such a manner that it can be fed back out to rejoin the tow, should it become necessary to rewind a portion of the tow during the fiber placement process.

In one form of the invention, the backing film is wound onto a paper or cardboard core for ease of removal and handling.

An apparatus, according to the invention, may include a magnetic clutch, or other form of a slip clutch, for maintaining tension in a roll of the backing film. In fiber placement apparatuses supplying multiple tows of fibers from multiple spools, multiple wind-up apparatuses, each having an individual slip clutch, may be driven from a common drive motor.

It will be appreciated, by those having skill in the art, that the invention may also be practiced in the form of a method for handling a strip of backing film coiled between layers of a length of fiber tow forming a coiled portion of the fiber tow, during a fiber placement process in which a dispensed portion of the length of fiber tows fed out from the coiled portion of the length of fiber tow to a fiber placement head of a fiber placement machine. Such a method includes the steps of separating a separated portion of the backing film from the dispensed portion of the length of fiber tow, as a dispensed portion of the fiber tows fed out to the fiber placement head, while simultaneously winding at least part of the separated portion of the strip of backing film into a roll of separated backing film distinct from both the dispensed and coiled portions of the fiber tow, as the dispensed portion of the length of fiber tow is being fed out to the fiber placement head.

A method, according to the invention, may also include winding the roll of at least part of the separated portion of the backing film onto a core, and may further include removing the core with the roll of separated backing film wound thereupon.

A method, according to the invention, may include sensing a mismatch in relative rotations of the roll and the coil, and generating a signal indicative of the detected mismatch. A method may also include monitoring a rotational speed of the roll, in determining therefrom an indication of the length of fiber tow remaining in the coiled portion of the length of fiber tow, to thereby determine when the coil will be exhausted.

Some forms of the invention may include continuously applying a winding torque to the roll of separated backing film, and a coiling torque to the coiled portion of the fiber tow, in such a manner that tension is continuously applied to the separated portion of the backing film. A desired winding torque may be applied to the roll of separated backing material through an arrangement having a winding torque source producing a roll-drive torque equal to or greater than the desired winding torque, and applying the desired winding torque to the roll of separated backing material through a slip-type clutch apparatus which is configured to slip when the roll-drive torque being applied to the drive roll exceeds the desired winding torque. The slip clutch apparatus may include a magnetic clutch, with a method, according to the invention, further including applying the desired winding torque to the roll of separated backing material through operation of the magnetic clutch.

In practicing the invention, a tensile force may be applied to the dispensed portion of the fiber tow, with the tensile force on the dispensed portion generally being resisted by the coiling torque on the coiled portion of the fiber tow, in such a manner that when the tensile force applied to the dispensed portion of the fiber tow exceeds the resistance of the coiling torque, the fiber tow is fed to the fiber replacement head and the separated portion of the backing film is wound into the roll of separated backing film.

Some forms of the invention include rewinding together a portion of the separated strip of backing film and a corresponding part of the dispensed portion of the length of fiber tow, into the coiled length of fiber tow, with the rewound portion of the backing film being once again substantially coiled between the layers of the length of fiber tow in the coiled portion of the length of fiber tow. Some forms of the invention may include guiding the rewound portion of the separated strip of backing film, as it is rewound, to achieve a desired placement of the rewound portion of the backing film relative to the rewound portion of the dispensed portion of the fiber tow in the coiled portion of the fiber tow. The rewound portion of the separated strip of backing film may include a section thereof which is unwound from the roll of separated backing film.

Where a fiber placement head is movable from a first position closer to the coil of fiber tow, to a second position farther from the coil of the fiber tow a method, according to the invention, may include the steps of: separating a separated portion of the strip of backing film from the dispensed portion of the fiber tow, and winding the separated portion of the strip of backing film into the roll of backing film as the fiber placement head moves toward the second position thereof, farther from the coil of the length of fiber tow; and rewinding together the portion of the strip of backing film from the roll of backing film and the portion of the length of fiber tow previously fed out to the fiber placement head into the coil length of the fiber tow, with the rewound portion of the backing film being once again substantially coiled between layers of the coil of fiber tow, as the fiber placement head moves toward the first position thereof, closer to the coiled position of the length of the fiber tow. A winding torque may be continuously applied to the roll of separated backing film, and a coiling torque may be continuously applied to the coiled portion of the fiber tow, in such a manner that tension is continuously applied to the separated portion of the backing film.

In practicing the invention, a tensile force applied to the dispensed portion of the fiber tow may be generally resisted by a coiling torque on the coiled portion of the fiber tow in such a manner that: when the tensile force applied to the dispensed portion of the fiber tow exceeds the resistance of the coiling torque, the fiber tow is fed to the fiber placement head and the separated portion of the backing film is wound into the roll of separated backing film; and when the tensile force applied to the dispensed portion of the fiber tow is less than the resistance of the coiling torque, the dispensed portion of the fiber tow and the separated portion of the backing film are rewound into the coiled portion of the length of fiber tow.

In practicing the invention, the roll of the at least part of the separated portion of the backing film may be wound onto a core. The core may be removed with the roll of separated backing film wound thereupon.

Other aspects, objects and advantages of the invention will be apparent upon consideration of the following description of exemplary embodiments, in conjunction with the accompanying drawings and attachments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
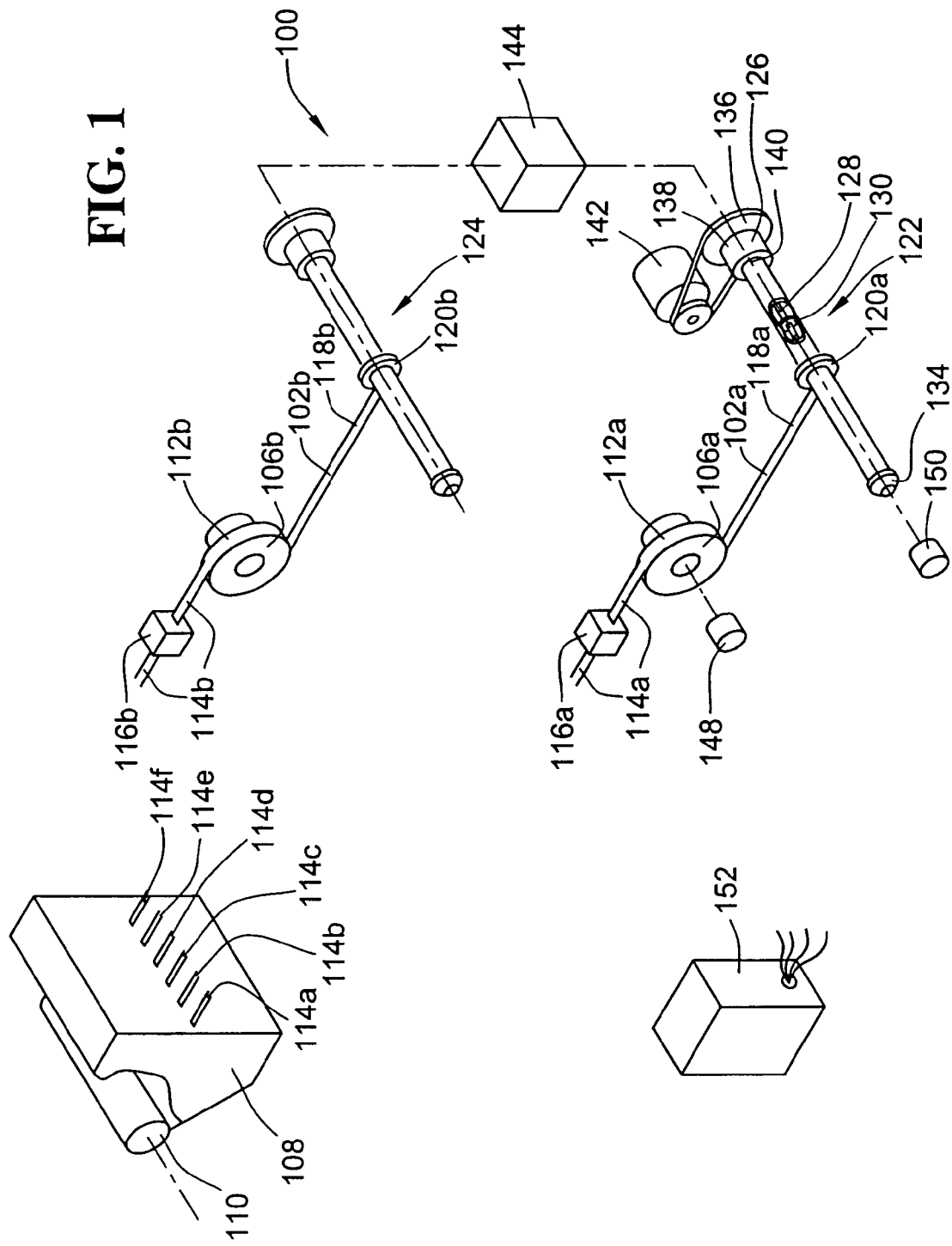
FIG. 1 is a perspective schematic illustration of a first exemplary embodiment of a backing film rewind apparatus, according to the invention.

FIG. 1 illustrates a first exemplary embodiment of a backing film rewind apparatus 100, according to the invention, for handling strips of backing film 102a, 102b coiled between layers of two lengths of fiber tows 114a-b forming coiled portions 106a-b of the fiber tows 102a-b, during a fiber placement process in which a dispensed portion, to be described in greater detail below, of each of the lengths of fiber tows 114a-b is fed out from the coiled portions 106a-b of the lengths of fiber tows 114a-b to a fiber placement head 108 of a fiber placement machine (with the fiber placement head 108 representing the fiber placement machine in FIG. 1) for placement of the fiber tows 114a-b, as a band of fiber tows, onto the surface of a tool (not shown) by a compaction roller 110 of the fiber placement head 108.

In the exemplary embodiment, illustrated in FIG. 1, the coiled portions 106a-b of the fiber tows 114a-b are schematically illustrated as being respectively operatively coupled to individual coil drive motors 112a-b.

Those having skill in the art, will recognize that in an actual application of the invention, within a typical creel of a fiber placement machine, the lengths of fiber tows 114a-b would typically be wound onto spools (not shown) and mounted on rotatable drums operatively coupled to the coil drive motor 112a-b used for driving each of the respective spools of coiled fiber tows 106a-b.

Those having skill in the art, will further recognize that in an actual creel installation, various tensioning and redirect members will also be present between the coiled portions 106a-b of the fiber tows 114a-b and the fiber placement head 108. In FIG. 1, these additional elements are schematically illustrated as tow tensioning and redirect elements 116a-f.

For purposes of clarity of description, the spools, and other associated elements of a typical creel have been omitted from the exemplary embodiment of the invention, as illustrated in FIG. 1.

It will further be recognized, as a matter of definition, that to facilitate description of the invention, a section of the fiber tows 114a-b extending outward from the coiled portions 106a-f of the lengths of fiber tows 114a-b is referenced herein as the dispensed portion 114a-b of the fiber tows. The dispensed portions 114a-b of the fiber tows extend, generally, from the coiled portions 106a-b of the lengths of fiber tows 114a-b to a feed roller (not shown) of the fiber placement head 108.

The coil drive motors 112a-b are driven in a forward direction to feed the dispensed portions 114a-b of the lengths of fiber tows to the fiber placement head 108, for placement onto the tool by the compaction roller 110. During the course of a typical fiber placement process, it may be necessary for the fiber placement head 108 to move, from an extended position, back toward the coiled portions 106a-b of the lengths of fiber tows. In such instances, the coil drive motors 112a-b drive the coiled portions 106a-b in an opposite direction, from the feed direction, to rewind the dispensed portions 114a-b back onto their respective coiled portions 106a-b.

As will be understood, by those having skill in the art, as a necessary part of the fiber tows 114a-b being fed out to the fiber placement head 108, a portion of the strips of backing film 102a-b must be separated from the dispensed portion 114a-b of the fiber tows, as the dispensed portions 114a-b of the fiber tows are fed out from the coiled portions 106a-b of the lengths of fiber tows. In FIG. 1, the separated portions 118a-b of the strips of backing film 102a-b extend from a point of separation with the dispensed portions 114a-b of the fiber tows, located along the periphery of the coiled portions 106a-b of the fiber tows, to a point of attachment to a roll drive arrangement 122, 124, of the backing film wind up apparatus 100. Specifically, the distal ends of the separated portions 118a-b of the strips 102a-b of backing film are separately wound to form respective rolls 120a-b of the separated portions 118a-b of the strips of backing film 102a-b.

The first exemplary embodiment of the backing film wind up apparatus 100, according to the invention, includes a first and a second roll drive arrangements 122, 124, with the first roll drive apparatus 122 being operatively connected for handling the strip of backing film 102a from three of the coiled portions 106a of the lengths of fiber tows 114a. In similar fashion, the second roll drive arrangement 124, of the first exemplary embodiment of the backing film wind up apparatus 100, is operatively connected for handling the separated portions 118b of the strip of backing film 102b from the coiled portion 106b of the length of fiber tow 114b. It will be understood, that in other embodiments of the invention, a backing film wind up apparatus, according to the invention, may include only one, or more than two roll drive apparatuses, in accordance with the invention.

As shown in FIG. 1, the first roll drive arrangement 122 includes a slip clutch 126 for applying a winding torque continuously to the roll 120a of separated backing film, regardless of whether the fiber tow 114a, from which the backing film 102a is separated: is being fed outward from the coiled portions 106a of the length of fiber tow 114a to the fiber placement head 108; is being rewound into the coiled portions 106a of the length of fiber tow 114a; or, is stationary between the coiled portion 106a of the length of fiber tow 114a and the fiber placement head 108.

As illustrated by the cutaway section, in FIG. 1, the first roll drive arrangement 122 includes a core support and drive member, in the form of a shaft 128, having a plurality of spacers 130 attached thereto, with the spacers 130 and shaft 128 being adapted for drivingly engaging an inside surface of a removable core 132, upon which the roll 120a of the separated portion 118a is wound. It is contemplated that the removable core 132, according to the invention, would preferably be formed from a material that is readily disposable, recyclable, and/or incinerable, such as cardboard, paper, or plastic. The distal ends of the separated portion 118a of the strip of backing film 102a is attached to the removable core 132, by being taped, tied, or otherwise secured to the removable core 132, in such a manner that rotation of the core 132 will form the roll 120a of the separated portion 118a of the strip of backing film 102a on the core, as the fiber tow 104a is fed out to the fiber placement head 108. The core 132 is installed by sliding the core 132 onto the shaft 128 and over the spacers 130. In some embodiments of the invention it may be desirable to use structures other than the spacers 130, to rotationally secure the core 132 on the shaft 128, such as an inflatable bladder disposed between the shaft and the inside surface of the core 132. A removable core retainer cap, or collar, 134 is attached to the end of the shaft 128, for holding the removable core 132 in place on the shaft 128, during operation of the backing film rewind apparatus.

In the first roll drive arrangement 122, in the first exemplary embodiment of the backing film wind-up apparatus 100, the slip clutch 126 is a permanent magnet-type clutch, such as, for example, Part No. MC2-14, M Series Permanent Magnet Precision Torque Clutch, providing break-away torque in the range of 1-22 oz.in, as supplied by Warner Electric, of South Beloit, Ill., US. It will be understood, however, that in alternate embodiments of the invention, other types of appropriate slip clutch constructions may be utilized in practicing the invention. It may be advantageous, in some embodiments of the invention, to have the slip clutch 126 be adjustable, to provide various torque settings for different backing film materials.

As further illustrated in FIG. 1, the magnetic slip clutch 126, of the first roll drive apparatus 122 includes an input 136, thereof operatively connected to a drive member, in the form of a pulley 138. The magnetic clutch 126 also includes an output 140 thereof, which is operatively attached to the shaft 128, with the magnetic clutch 126 being internally configured to impart rotational motion to the shaft 128 below, or at, a maximum driving torque of the clutch 126, and to allow relative rotation of the pulley 138 with respect to the shaft 128 above the maximum driving torque of the clutch 126.

As shown in FIG. 1, the first roll drive arrangement 122 also includes a roll drive motor 142, which is operatively connected by a belt and pulley drive arrangement to the drive member 138.

As will be understood, from an examination of FIG. 1, the first and second roll drive arrangements 122, 124 of the exemplary embodiment of the backing film wind-up apparatus 100, are essentially identical, with the exception of the inclusion of the roll drive motor 142 and the pulley and belt connection to the drive pulley 138 of the first roll drive arrangement 122. The second roll drive arrangement 124 is operatively connected through an interconnecting drive apparatus 144, in such a manner that both the first and second roll drive arrangements 122, 124 are simultaneously driven by the single, common, roll drive motor 142. Those having skill in the art will recognize that the interconnecting drive apparatus 144 may take any appropriate form, in practicing the invention, such as intermeshing gears, pulley and belt drive arrangements, chain and sprocket arrangements, etc.

From the foregoing description, it will be understood that the first and second roll drive arrangements 122, 124, of the exemplary embodiment of the backing film wind-up apparatus 100, are configured such that, when the dispensed portions 114a-b of the fiber tows 104a-b are fed out to the fiber placement head 108, the separated portions 118a-b of the strips of backing film 102a-f are separated from the dispensed portions 114a-b of the lengths of fiber tows, and wound at least partially into the respective rolls 120a-b of separated backing film. The rolls 120a-b are distinct from both the dispensed and coiled portions 114a-b, 106a-b of the fiber tows, as the dispensed portions 114a-b of the lengths of fiber tows are being fed out to the placement head 108. It will be further recognized, that the first and second roll drive arrangements 122, 124, of the first exemplary embodiment of the backing film wind-up apparatus 100, according to the invention, are also configured such that when the dispensed portions 114a-b of the fiber tows are being rewound, part of the separated portions 118a-b of the strips of backing film 102a-b, and a corresponding part of the dispensed portions 114a-b of the lengths of fiber tow 104a-b are rewound into the coil lengths 106a-b of the fiber tows 104a-b, with the rewound portions of the backing film 102a-b being once again substantially coiled between layers of the length of fiber tows 104a-b in the coiled portions 106a-b of the lengths 104a-b of the fiber tows.

Those having skill in the art will recognize, that in actual practice of the invention, the coiled portions 106a-b of the fiber tows 114a-b will generally have a greater axial length than is illustrate in FIG. 1. Accordingly, the rolls 120a-b of the separated portions 118a-b of the strips of backing film 102a-b will also have a width greater than the narrow rolls illustrated in FIG. 1. In practice of the invention, it has been observed that, as the separated portions 118a-b are wound onto the core 132, the separated portion 118a-b of the strip of backing film 102a-b tends to naturally track its corresponding part of the dispensed portion 114a-b of its corresponding length of fiber tow sufficiently closely that it is not generally necessary to provide any sort of guide mechanism for realigning the separated portions 118a-b of the strips of backing film 102a-b with the dispensed portions 114a-b of the fiber tows, when the fiber tows 114a-b are rewound into the coiled portions 106a-b of the fiber tows. It is contemplated, however, that in some embodiments of the invention, it may be desirable to add a guide arrangement, as indicated schematically at 146 in FIG. 1, for achieving a desired degree of alignment between one or more of the separated portions 118a-b of the strips of backing film 102a-f with its corresponding dispensed portion 114a-b of the fiber tows. Such an alignment guide arrangement 146 may take any appropriate form, as is known in the art.

It will be further noted, that in the exemplary embodiment of the backing film wind-up apparatus 100, shown in FIG. 1, the first roll drive arrangement includes the common drive motor 142, to thereby form a master roll drive arrangement, and the second roll drive arrangement 124 is operatively connected to the master roll drive arrangement 122 to be driven as a slave roll drive arrangement 124 by the motor 142 of the master roll drive arrangement 122.

As shown in FIG. 1, a backing film wind-up apparatus 100, according to the invention, may also include one or more sensing elements 148, 150 for sensing control parameters of the apparatus 100, and/or a controller 152 operatively connected for controlling the apparatus 100, or processing signals from the sensing elements 148, 150. Such sensing elements may take a variety of forms and be operatively connected in any appropriate manner, and are not necessarily limited to the configurations and connections illustrated for the sensing elements 148, 150 in FIG. 1.

For example, in some forms of the invention, the apparatus 100 may include one or more sensing elements 148, 150 operatively connected for detecting relative rotation between the coiled portion 106 of one of the lengths of fiber tow 114, and the roll 120 of the separate strip of backing film 118 associated with that fiber tow 114. In general, whenever the coiled portion 106 of the fiber tow 114 is rotating, the roll 120 of the separated portion 118 of the strip of backing film 102 should also be rotating, to either wind up the separated portion 118 as it is unwound from, or rewound into the coiled portion 106 of the length of fiber tow 114. In this manner, certain malfunctions, such as a breakage of the strip of backing film 102 between the coiled portion 106 and the roll 120, for example, or failure of the roll drive motor 142 or the slip clutch 126 may be detected.

In another exemplary embodiment of the invention, a backing film wind-up apparatus may include one or more sensing elements 148, 150 operatively connected for detecting a rotational speed of one of the rolls 120, for example, to provide an indicator of the extent of the length of fiber tow 114 remaining in the coiled portion 106 of the coiled portion 106 relating to the roll 120. Such an arrangement relies upon the fact that as the fiber tow 114 is dispensed from the coiled portion 106, and the strip of backing film 102 associated therewith is wound into the roll 120, the rotational speed of the roll will decrease, and the rotational speed of the coiled portion 106 will increase as the fiber tow 114 approaches its expended, i.e. full dispensed condition. Accordingly, the rotational speed of the roll can be utilized for estimating the extent of the length of the fiber tow 114 still remaining coiled within the coiled portion 106, and a signal generated to alert an operator of the need to shut down the fiber placement operation to replace the expended coiled portion 106 with a new coil of fiber tow 114.

Figure 2:
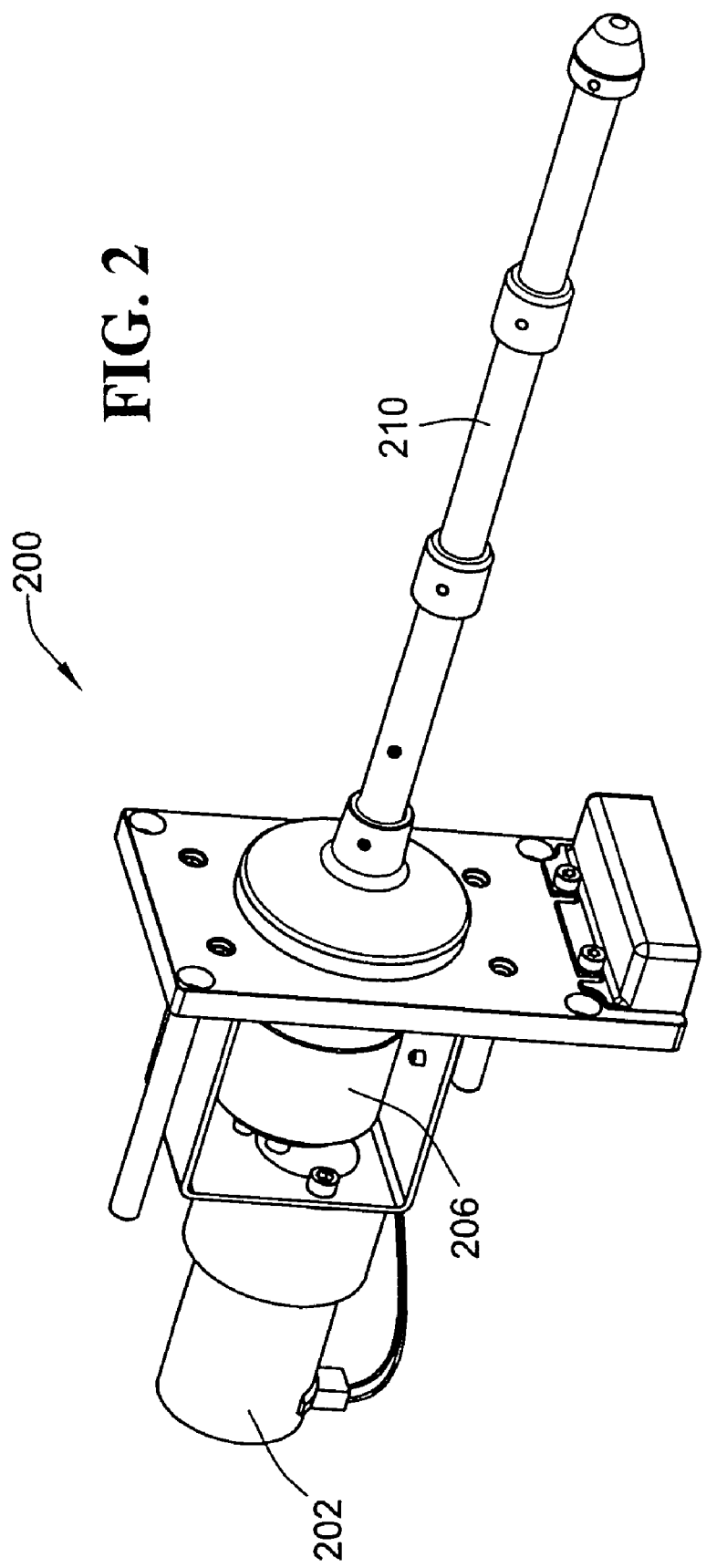
FIGS. 2 and 3 are, respectively, a perspective illustration, and a partially cut-away orthographic illustration of a second exemplary embodiment of a backing film rewind apparatus, according to the invention.
Figure 3:
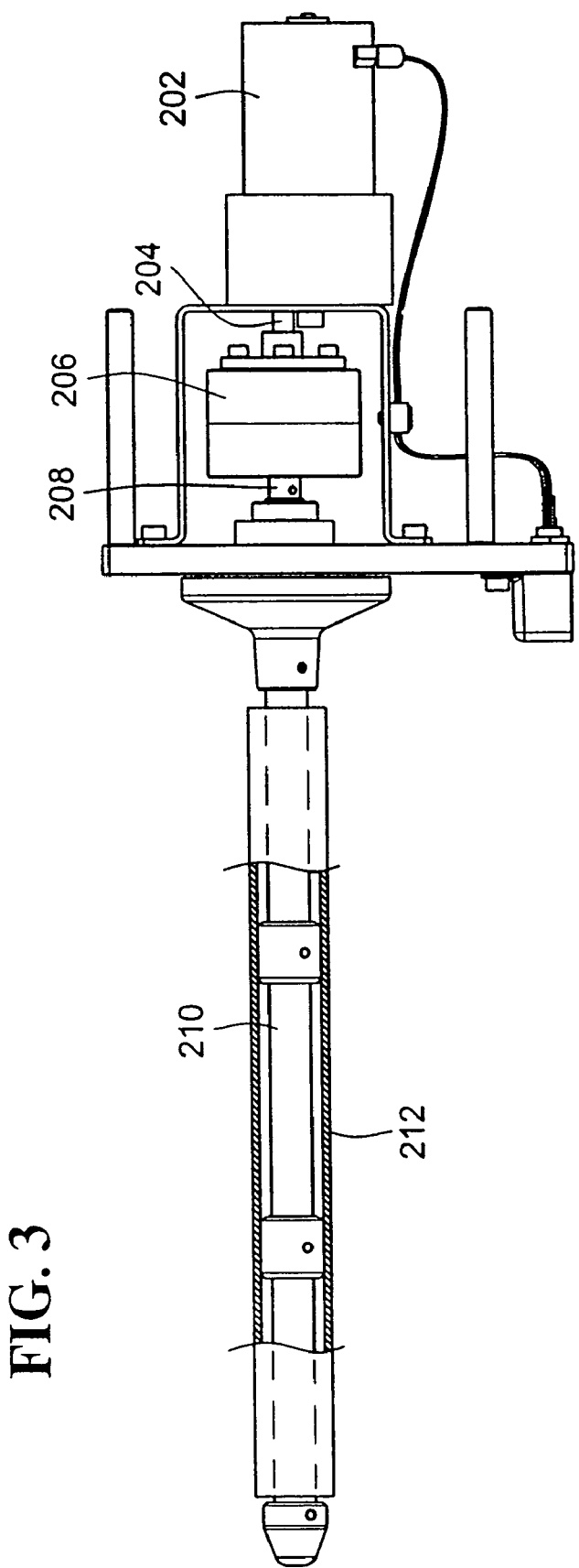

FIGS. 2 and 3 illustrate a second exemplary embodiment of a backing film rewind apparatus 200, in which a roll drive motor 202 is connected directly to the input 204 of a slip clutch 206, with the output 208 of the slip clutch being connected directly to a shaft 210 adapted for support and driving attachment thereto of a core 212, in the same manner as described above in relation to the first exemplary embodiment shown in FIG. 1. In general, it will be seen from a comparison of the embodiments illustrated in FIG. 1 with the embodiment shown in FIGS. 2 and 3, that the second embodiment 200 is substantially identical to the first drive arrangement 122 of the first embodiment 100, with the exception that the drive motor 202 is connected directly to the input of the slip clutch 206, in the second embodiment 200, rather than being connected through a belt and pulley system, as was the case for the drive motor 142 in the first drive arrangement of the first exemplary embodiment shown in FIG. 1.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. In a fiber tow placement apparatus, a backing film rewind apparatus, for handling a strip of backing film coiled between layers of a length of fiber tow forming a coiled portion of the fiber tow, the apparatus comprising, a roll drive arrangement having a slip clutch for applying a winding torque continuously to the roll of separated backing film regardless of whether the fiber tow from which the backing film is separated:
   is being fed outward from the coiled portion of the length of fiber tow to the fiber placement head;
   is being rewound into the coiled portion of the length of fiber tow; or
   is stationary between the coiled portion of the length of fiber tow and the fiber placement head.

2. The apparatus of claim 1, wherein, the slip clutch is a magnetic clutch, having an input adapted to be driven by a roll winding drive source, and an output operatively connected to the roll for applying the winding torque thereto.

3. The apparatus of claim 2, wherein, the roll winding drive source comprises a drive motor.

4. The apparatus of claim 3, wherein:
   the roll drive arrangement includes multiple drive arrangements each having a core support and drive member operatively adapted for removable installation thereupon of a removable core;
   the backing film rewind apparatus is configured for simultaneously winding the dispensed portion of a strip of backing paper separated from each of one or more coiled lengths of fiber tows into separate rolls of backing film on the core; and
   wherein the drive motor is a common drive motor, the common drive motor driving each drive member of the multiple drive arrangements.

5. The apparatus of claim 1, wherein, the driving arrangement is configured such that:
   when the dispensed portion of the fiber tow is fed out to the fiber placement head, the separated portion of the backing film is separated from the dispensed portion of the length of fiber tow and wound at least partially into a roll of separated backing film distinct from both the dispensed and coiled portions of the fiber tow as the dispensed portion of the length of fiber tow is being fed out to the fiber placement head; and
   when the dispensed portion of the fiber tow is being rewound, a portion of the separated strip of backing film and a corresponding part of the dispensed portion of the length of fiber tow are rewound into the coiled length of the fiber tow, with the rewound portion of the backing film being once again substantially coiled between the layers of the length of fiber tow in the coiled portion of the length of fiber tow.

6. The apparatus of claim 5, wherein, the slip clutch is a magnetic clutch, having an input adapted to be driven by a roll winding drive source, and an output operatively connected to the roll for applying the winding torque thereto.

7. The apparatus of claim 6, wherein, the roll winding drive source comprises a drive motor.

8. The apparatus of claim 7, wherein:
   the roll drive arrangement includes multiple roll drive arrangements each having a core support and drive member operatively adapted for removable installation thereupon of a removable core;
   the backing film rewind apparatus is configured for simultaneously winding the dispensed portion of a strip of backing paper separated from each of one or more coiled lengths of fiber tows into separate rolls of backing film on the core; and
   wherein the drive motor is a common drive motor, the common drive motor driving each drive member of the multiple drive arrangements.

9. In a fiber tow placement apparatus, a backing film rewind apparatus, for handling a strip of backing film coiled between layers of a length of fiber tow forming a coiled portion of the fiber tow, during a fiber placement process in which a dispensed portion of the length of fiber tow is fed out from the coiled portion of the length of fiber tow to a fiber placement head of a fiber placement machine, the apparatus comprising:
   a roll drive arrangement having a slip clutch, the roll drive arrangement applying a continuous winding torque to the roll of separated backing film regardless of whether the fiber tow from which the backing film is separated:
   is being fed outward from the coiled portion of the length of fiber tow to the fiber placement head;
   is being rewound into the coiled portion of the length of fiber tow; or
   is stationary between the coiled portion of the length of fiber tow and the fiber placement head.

10. The apparatus of claim 9, wherein, the driving arrangement is configured such that:
   when the dispensed portion of the fiber tow is fed out to the fiber placement head, the separated portion of the backing film is separated from the dispensed portion of the length of fiber tow and wound at least partially into a roll of separated backing film distinct from both the dispensed and coiled portions of the fiber tow as the dispensed portion of the length of fiber tow is being fed out to the fiber placement head; and
   when the dispensed portion of the fiber tow is being rewound, a portion of the separated strip of backing film and a corresponding part of the dispensed portion of the length of fiber tow are rewound into the coiled length of the fiber tow, with the rewound portion of the backing film being once again substantially coiled between the layers of the length of fiber tow in the coiled portion of the length of fiber tow.

11. The apparatus of claim 10, wherein, the driving arrangement comprises:
   a rotatable member operatively connected through the slip clutch to a drive motor;
   the rotatable member being adapted for attachment thereto of a distal leading end of the separated portion of the backing film and winding at least part of the separated portion of the strip of backing film into a roll of separated backing film distinct from both the dispensed and coiled portions of the fiber tow as the dispensed portion of the length of fiber tow is being fed out to the fiber placement head;

the slip clutch having an input thereof operatively connected to the drive motor, and an output thereof operatively attached to the rotatable member, with the slip clutch being configured to impart rotational motion to the rotatable member below or at a maximum driving torque of the slip clutch, and to allow relative rotation of the drive motor with respect to the rotatable member above the maximum driving torque of the slip clutch.

12. The apparatus of claim 11, wherein:
the rotatable member includes multiple rotatable members each having a core support and drive member operatively adapted for removable installation thereupon of a removable core;
the backing film rewind apparatus is configured for simultaneously winding the dispensed portion of a strip of backing paper separated from each of one or more coiled lengths of fiber tows into separate rolls of backing film on the core; and
wherein the drive motor is a common drive motor, the common drive motor driving each drive member of the multiple rotatable members.

13. The apparatus of claim 12, further comprising, one or more sensing elements for sensing a control parameter of the apparatus, operatively connected within the apparatus.

14. The apparatus of claim 13, wherein, the apparatus comprises one or more sensing elements operatively connected for detecting relative rotation between the coiled portion of the length of fiber tow and the roll of the separated strip of backing film.

15. The apparatus of claim 14, wherein, the apparatus comprises one or more sensing elements operatively connected for detecting a rotational speed of the roll, as an indicator of the extent of the length of fiber tow remaining in the coiled portion thereof.

16. The apparatus of claim 12, further comprising, a removable retainer selectively attachable and detachable to the core support and drive member, for retaining the core on the core support and drive member.

17. The apparatus of claim 12, wherein, the slip clutch comprises a magnetic clutch.

18. The apparatus of claim 12, further comprising a guide for guiding the separated portion of the backing film back into place, substantially between layers of the fiber tow in the coiled portion of the length of fiber tows, when the dispensed portion of the fiber tow is rewound into the coiled portion of the length of fiber tow.

19. The apparatus of claim 12, further comprising:
one or more elements or members from the group consisting of a motor and one or more sensing elements for sensing a control parameter of the apparatus; and
a controller operatively connected for controlling the members of the group of elements or members.

20. The apparatus of claim 9, wherein:
the roll drive arrangement includes multiple roll drive arrangements each having a core support and drive member operatively adapted for removable installation thereupon of a removable core;
the backing film rewind apparatus is configured for simultaneously winding the dispensed portion of a strip of backing paper separated from each of one or more coiled lengths of fiber tows into separate rolls of backing film on the
wherein the apparatus further comprises a common drive motor, the common drive motor driving each drive member of the multiple drive arrangements.

21. The apparatus of claim 9, wherein, the slip clutch comprises a magnetic clutch.

22. In a fiber tow placement apparatus, a backing film rewind apparatus, for handling strips of backing film coiled between layers of lengths of fiber tows forming a coiled portion of the fiber tows, during a fiber placement process in which a dispensed portion of each length of fiber tow is fed out from the coiled portion of the length of fiber tow to a fiber placement head of a fiber placement machine, the apparatus comprising:
a plurality of roll drive arrangements each having a magnetic slip clutch, the plurality of roll drive arrangements each applying a continuous winding torque to the strips of separated backing film regardless of whether the fiber tow from which the backing film is separated, is being fed outward from the coiled portion of the length of fiber tow to the fiber placement head, is being rewound into the coiled portion of the length of fiber tow, or is stationary between the coiled portion of the length of fiber tow and the fiber placement head;
the plurality of roll drive arrangements each including a core support and drive member operatively adapted for removable installation thereupon of a removable core, the drive member operatively connected through the magnetic slip clutch to a drive motor;
the backing film rewind apparatus being configured for simultaneously winding the dispensed portion of a strip of backing paper separated from each of one or more coiled lengths of fiber tows into separate rolls of backing film on the core;
the plurality of roll drive arrangements being configured such that, when the dispensed portion of the fiber tow is fed out to the fiber placement head, the separated portion of the backing film is separated from the dispensed portion of the length of fiber tow and wound at least partially into a roll of separated backing film distinct from both the dispensed and coiled portions of the fiber tow as the dispensed portion of the length of fiber tow is being fed out to the fiber placement head, and also configured such that when the dispensed portion of the fiber tow is being rewound, part of the separated portion of the strip of backing film and a corresponding part of the dispensed portion of the length of fiber tow are rewound into the coiled length of the fiber tow, with the rewound portion of the backing film being once again substantially coiled between the layers of the length of fiber tow in the coiled portion of the length of fiber tow;
each drive member of the plurality of roll drive arrangements being adapted for attachment thereto of a distal leading end of the separated portion of the backing film and winding at least part of the separated portion of the strip of backing film into a roll of separated backing film distinct from both the dispensed and coiled portions of the fiber tow as the dispensed portion of the length of fiber tow is being fed out to the fiber placement head;
the magnetic slip clutch having an input thereof operatively connected to the drive motor, and an output thereof operatively attached to the drive member, with the slip clutch being configured to impart rotational motion to the drive member below or at a maximum driving torque of the slip clutch, and to allow relative rotation of the drive motor with respect to the drive member above the maximum driving torque of the slip clutch; and
wherein the drive motor is a common drive motor, the common drive motor commonly driving each drive member of the plurality of roll drive arrangements simultaneously.

23. The apparatus of claim 22, further comprising, a removable retainer selectively attachable and detachable to the core support and drive member, for retaining the core on the core support and drive member.

24. The apparatus of claim 22, wherein, one of the plurality of roll drive arrangements is operatively connected to the common drive motor, to thereby form a master roll drive arrangement, and the other roll drive arrangements of the plurality have their respective drive members operatively connected to the master roll drive arrangement to be driven as slave roll drive arrangements by the motor of the master roll drive arrangement.

* * * * *

UNITED STATES PATENT AND TRADEMARK OFFICE
CERTIFICATE OF CORRECTION

PATENT NO.        : 7,748,425 B2                                         Page 1 of 1
APPLICATION NO.   : 11/510012
DATED             : July 6, 2010
INVENTOR(S)       : Mark Curtis Tingley It is certified that error appears in the above-identified patent and that said Letters Patent is hereby corrected as shown below:

Column 11, Claim 20,
Line 62, after "on the", insert --core; and--.

Signed and Sealed this

Thirty-first Day of August, 2010

David J. Kappos
*Director of the United States Patent and Trademark Office*